(12) United States Patent
Zhou et al.

(10) Patent No.: US 12,013,951 B2
(45) Date of Patent: Jun. 18, 2024

(54) CROSS-SITE SCRIPTING (XSS) RISK ANALYSIS METHOD AND APPARATUS BASED ON BAYESIAN NETWORK AND STRIDE MODEL

(71) Applicant: NATIONAL UNIVERSITY OF DEFENSE TECHNOLOGY, Changsha (CN)

(72) Inventors: Yun Zhou, Changsha (CN); Pengtao Fu, Changsha (CN); Xianqiang Zhu, Changsha (CN); Zhaoyun Ding, Changsha (CN); Cheng Zhu, Changsha (CN)

(73) Assignee: NATIONAL UNIVERSITY OF DEFENSE TECHNOLOGY, Changsha (CN)

( * ) Notice: Subject to any disclaimer, the term of this patent is extended or adjusted under 35 U.S.C. 154(b) by 0 days.

(21) Appl. No.: 17/860,123

(22) Filed: Jul. 8, 2022

(65) Prior Publication Data
US 2023/0025695 A1 Jan. 26, 2023

(30) Foreign Application Priority Data
Jul. 19, 2021 (CN) .......................... 202110815842.2

(51) Int. Cl.
*G06F 21/00* (2013.01)
*G06F 21/57* (2013.01)

(52) U.S. Cl.
CPC ...... *G06F 21/577* (2013.01); *G06F 2221/034* (2013.01)

(58) Field of Classification Search
CPC ............. G06F 21/577; G06F 2221/034; G06F 2221/033; G06F 21/316; H04L 63/1433;
(Continued)

(56) References Cited

U.S. PATENT DOCUMENTS

| 2018/0198807 A1* | 7/2018 | Johns ................... H04L 63/1425 |
| 2018/0288086 A1 | 10/2018 | Amiri et al. |
| 2020/0128025 A1* | 4/2020 | Sant-Miller ............ G06N 5/003 |

FOREIGN PATENT DOCUMENTS

| CN | 102724199 A | 10/2012 |
| CN | 107360152 A | 11/2017 |

(Continued)

OTHER PUBLICATIONS

Li Ming, et al., Research on Real-time Online Intelligent Detection Technology of SQL Injection Behavior, Journal of Hunan University(Natural Sciences), 2020, pp. 31-41, vol. 47, No. 8.

(Continued)

*Primary Examiner* — Tri M Tran
(74) *Attorney, Agent, or Firm* — Bayramoglu Law Offices LLC (57) ABSTRACT

A cross-site scripting (XSS) risk analysis method based on a Bayesian network and a STRIDE model includes: constructing an XSS attack-related STRIDE threat model of a network information release system; obtaining a network structure of a Bayesian network-based XSS attack risk analysis model based on the STRIDE model; obtaining prior probabilities of all nodes in the network structure of the Bayesian network-based XSS attack risk analysis model based on expert experience and a node ranking algorithm; obtaining a training dataset through simulation by using a rejection sampling algorithm or a direct sampling method; performing network training on the network structure of the Bayesian network-based XSS attack risk analysis model by using the training dataset to obtain the Bayesian network-based XSS attack risk analysis model; and reasoning a Bayesian network to obtain a quantitative analysis result of an XSS attack risk of the network information release system.

17 Claims, 3 Drawing Sheets

(58) Field of Classification Search
CPC ............ H04L 63/1416; H04L 63/1425; H04L 63/1441; H04L 63/145; H04L 63/14; H04L 2463/146

See application file for complete search history.

(56) References Cited

FOREIGN PATENT DOCUMENTS

| CN | 108540329 A | | 9/2018 |
|---|---|---|---|
| CN | 109088899 A | | 12/2018 |
| CN | 109766693 A | | 5/2019 |
| CN | 109981631 A | | 7/2019 |
| CN | 110266675 A | | 9/2019 |
| CN | 110430158 A | * | 11/2019 |
| CN | 111614616 A | | 9/2020 |
| CN | 112069726 A | | 12/2020 |
| CN | 112580050 A | | 3/2021 |

OTHER PUBLICATIONS

Sun Lijian, et al., New Implementation of Multi-Task Naïve Bayes Learning, Journal of Information Engineering University, 2020, pp. 221-226, vol. 21, No. 2.

Sun Bao-Dan, et al., Case Study of Using No Tears in XSS Attack Detection, Journal of Chinese Computer Systems, 2020, pp. 782-785, vol. 41, No. 4.

Li Luqun, et al., Security classification of cross-site scripting statements in cyberspace, Cyberspace Security, 2019, pp. 12-19, vol. 10, No. 7.

Wang Yan, et al., Typical Security Threats and Their Protection of Web Application in Digital Campus, Research and Exploration in Laboratory, 2012, pp. 189-193,213, vol. 31, No. 11.

* cited by examiner

CROSS-SITE SCRIPTING (XSS) RISK ANALYSIS METHOD AND APPARATUS BASED ON BAYESIAN NETWORK AND STRIDE MODEL

CROSS REFERENCE TO THE RELATED APPLICATIONS

This application is based upon and claims priority to Chinese Patent Application No. 202110815842.2, filed on Jul 19, 2021, the entire contents of which are incorporated herein by reference.

TECHNICAL FIELD

The present disclosure relates to the field of data processing, and in particular, to a cross-site scripting (XSS) risk analysis method and apparatus based on a Bayesian network and a STRIDE model, a computer device, and a storage medium.

BACKGROUND

With the increasing dependence of the modern society on web applications, a traditional information management system has been gradually transformed into an information network, however most of them are not perfect in attack detection and response. For example, a traditional information network with a star topology usually lack risk assessment on threats, such as a web attack, and face severe threats, such as confidential data disclosure and administration privilege theft in case of various web attacks. Among the web attacks, an XSS attack is more common and harmful.

At present, an XSS prevention method mainly filters input information on a server, but this method has a high rate of missing reports, cannot protect a network system in time, and is basically powerless in the face of complex cyber environment. Currently, three machine learning algorithms are used to predict the XSS attack, including a naive Bayes algorithm, a support vector machine (SVM) algorithm, and a J48 decision tree algorithm. All these three algorithms provide a good discrete attribute and detection result. A decision tree classification algorithm is also used to perform efficient analysis and detection for the XSS attack, or a NO TEARS algorithm is used to find a global solution of a Bayesian network structure learning problem and use the global solution for XSS attack detection with higher accuracy. Although all the current machine learning algorithms can effectively resolve XSS attack detection problems, they lack quantitative analysis on an XSS attack risk and cannot support subsequent defense decision-making activities.

SUMMARY

In view of this, it is necessary to provide an XSS risk analysis method and apparatus based on a Bayesian network and a STRIDE model to perform XSS risk analysis, a computer device, and a storage medium.

An XSS risk analysis method based on a Bayesian network and a STRIDE model includes:
  constructing an XSS attack-related STRIDE threat model of a network information release system;
  extracting information assets of the network information release system, a data flow between the information assets, and an XSS attack type corresponding to the data flow from the STRIDE threat model; and obtaining a network structure of a Bayesian network-based XSS attack risk analysis model based on the information assets, the data flow between the information assets, and the XSS attack type corresponding to the data flow;
  obtaining prior probabilities of all nodes in the network structure of the Bayesian network-based XSS attack risk analysis model based on expert experience and a node ranking algorithm;
  obtaining a training dataset through simulation by using a rejection sampling algorithm or a direct sampling method based on the prior probabilities of the nodes;
  performing network training on the network structure of the Bayesian network-based XSS attack risk analysis model by using the training dataset to obtain the Bayesian network-based XSS attack risk analysis model; and
  reasoning a Bayesian network based on the Bayesian network-based XSS attack risk analysis model to obtain a quantitative analysis result of an XSS attack risk of the network information release system.

In an embodiment, the step of obtaining the network structure of the Bayesian network-based XSS attack risk analysis model based on the information assets, the data flow between the information assets, and the XSS attack type corresponding to the data flow includes:
  taking the information assets as nodes in a Bayesian network model, and taking, as variable content of the nodes in the Bayesian network model, the XSS attack type corresponding to the data flow; setting a relationship between the nodes in the Bayesian network model based on hierarchical relationships of the information assets and a direction of the data flow between the information assets; and obtaining the network structure of the Bayesian network-based XSS attack risk analysis model based on the nodes in the Bayesian network model, the variable content of the nodes in the Bayesian network model, and the relationship between the nodes in the Bayesian network model.

In an embodiment, the nodes include a parent node and a child node; and the step of obtaining the prior probabilities of all the nodes in the network structure of the Bayesian network-based XSS attack risk analysis model based on the expert experience and the node ranking algorithm includes:
  obtaining a proportion of a vulnerability type in a Bayesian network model based on the expert experience, and taking the proportion of the vulnerability type as a prior probability of the parent node in the Bayesian network model; and performing ranking calculation on the child node in the Bayesian network model by using the node ranking algorithm to obtain a prior probability of the child node in the Bayesian network model.

In an embodiment, the training dataset includes a mixed Gaussian distribution dataset and a simple distribution dataset; and the step of obtaining the training dataset through simulation by using the rejection sampling algorithm or the direct sampling method based on the prior probabilities of the nodes includes: confirming, based on the prior probability of the parent node in the Bayesian network model, that the parent node in the Bayesian network model complies with a mixed Gaussian distribution, and obtaining the mixed Gaussian distribution dataset by using the rejection sampling algorithm; and confirming, based on the prior probability of the child node in the Bayesian network model, that the child node in the Bayesian network model complies with a simple distribution, and obtaining the simple distribution dataset by using the direct sampling method.

In an embodiment, the step of performing network training on the network structure of the Bayesian network-based XSS attack risk analysis model by using the training dataset to obtain the Bayesian network-based XSS attack risk analysis model includes: obtaining a bnlearn package; and performing network training on the network structure of the Bayesian network-based XSS attack risk analysis model by using the training dataset and a model2network function in the bnlearn package to obtain the Bayesian network-based XSS attack risk analysis model.

In an embodiment, the step of reasoning the Bayesian network based on the Bayesian network-based XSS attack risk analysis model to obtain the quantitative analysis result of the XSS attack risk of the network information release system includes: obtaining a key node and a non-key node in the Bayesian network; setting evidence conditions of an attacked state of the key node and a normal state or medium risk state of the non-key node; obtaining, through CP traversal-based query, probabilities that the key node and the non-key node are in a safe state; and obtaining the quantitative analysis result of the XSS attack risk of the network information release system based on the probabilities that the key node and the non-key node are in the safe state.

In an embodiment, the step of obtaining, through CP traversal-based query, the probabilities that the key node and the non-key node are in the safe state includes: obtaining, through CP traversal-based query by using a cpquery function in the bnlearn package, the probabilities that the key node and the non-key node are in the safe state under the evidence conditions.

An XSS risk analysis apparatus based on a Bayesian network and a STRIDE model includes:
- a STRIDE threat model obtaining module configured to construct an XSS attack-related STRIDE threat model of a network information release system;
- a network structure obtaining module configured to: extract information assets of the network information release system, a data flow between the information assets, and an XSS attack type corresponding to the data flow from the STRIDE threat model; and obtain a network structure of a Bayesian network-based XSS attack risk analysis model based on the information assets, the data flow between the information assets, and the XSS attack type corresponding to the data flow;
- a prior probability obtaining module configured to obtain prior probabilities of all nodes in the network structure of the Bayesian network-based XSS attack risk analysis model based on expert experience and a node ranking algorithm;
- a training dataset obtaining module configured to obtain a training dataset through simulation by using a rejection sampling algorithm or a direct sampling method based on the prior probabilities of the nodes;
- a network training module configured to perform network training on the network structure of the Bayesian network-based XSS attack risk analysis model by using the training dataset to obtain the Bayesian network-based XSS attack risk analysis model; and
- a Bayesian network reasoning module configured to reason a Bayesian network based on the Bayesian network-based XSS attack risk analysis model to obtain a quantitative analysis result of an XSS attack risk of the network information release system.

A computer device is provided, including a memory and a processor, where the memory stores a computer program, and the computer program is executed by the processor to perform the following steps:

constructing an XSS attack-related STRIDE threat model of a network information release system;

extracting information assets of the network information release system, a data flow between the information assets, and an XSS attack type corresponding to the data flow from the STRIDE threat model; and obtaining a network structure of a Bayesian network-based XSS attack risk analysis model based on the information assets, the data flow between the information assets, and the XSS attack type corresponding to the data flow;

obtaining prior probabilities of all nodes in the network structure of the Bayesian network-based XSS attack risk analysis model based on expert experience and a node ranking algorithm;

obtaining a training dataset through simulation by using a rejection sampling algorithm or a direct sampling method based on the prior probabilities of the nodes;

performing network training on the network structure of the Bayesian network-based XSS attack risk analysis model by using the training dataset to obtain the Bayesian network-based XSS attack risk analysis model; and reasoning a Bayesian network based on the Bayesian network-based XSS attack risk analysis model to obtain a quantitative analysis result of an XSS attack risk of the network information release system.

A computer-readable storage medium storing a computer program is provided, where the computer program is executed by a processor to perform the following steps:

constructing an XSS attack-related STRIDE threat model of a network information release system;

extracting information assets of the network information release system, a data flow between the information assets, and an XSS attack type corresponding to the data flow from the STRIDE threat model; and obtaining a network structure of a Bayesian network-based XSS attack risk analysis model based on the information assets, the data flow between the information assets, and the XSS attack type corresponding to the data flow;

obtaining prior probabilities of all nodes in the network structure of the Bayesian network-based XSS attack risk analysis model based on expert experience and a node ranking algorithm;

obtaining a training dataset through simulation by using a rejection sampling algorithm or a direct sampling method based on the prior probabilities of the nodes;

performing network training on the network structure of the Bayesian network-based XSS attack risk analysis model by using the training dataset to obtain the Bayesian network-based XSS attack risk analysis model; and reasoning a Bayesian network based on the Bayesian network-based XSS attack risk analysis model to obtain a quantitative analysis result of an XSS attack risk of the network information release system.

The XSS risk analysis method and apparatus based on a Bayesian network and a STRIDE model first construct an XSS attack-related STRIDE threat model of a network information release system; extract information assets of the network information release system, a data flow between the information assets, and an XSS attack type corresponding to the data flow from the STRIDE threat model; take the information assets as nodes in a Bayesian network model, and take, as variable content of the nodes in the Bayesian network model, the XSS attack type corresponding to the data flow; set a relationship between the nodes in the Bayesian network model based on hierarchical relationships of the information assets and a direction of the data flow between the information assets, and obtain a network structure of a Bayesian network-based XSS attack risk analysis model; obtain prior probabilities of all nodes in the network structure of the Bayesian network-based XSS attack risk analysis model based on expert experience and a node ranking algorithm; obtain a training dataset through simulation by using a rejection sampling algorithm or a direct sampling method based on the prior probabilities of the nodes; perform network training on the network structure of the Bayesian network-based XSS attack risk analysis model by using the training dataset to obtain the Bayesian network-based XSS attack risk analysis model; analyze the STRIDE threat model to convert the STRIDE threat model into the Bayesian network-based XSS attack risk analysis model, such that the Bayesian network-based XSS attack risk analysis model contains all information in the STRIDE threat model and has a reasoning capability; and reason a Bayesian network based on the Bayesian network-based XSS attack risk analysis model to obtain probabilities that the nodes in the Bayesian network model are in a safe state, so as to realize quantitative analysis of an XSS attack risk of a web system, where a smaller probability leads to a higher XSS attack risk of a corresponding node.

DETAILED DESCRIPTION OF THE EMBODIMENTS

To make the objectives, technical solutions, and advantages of the present disclosure clearer, the present disclosure is further described in detail below with reference to the accompanying drawings and embodiments. It should be understood that the specific embodiments described herein are merely used to explain the present disclosure, rather than to limit the present disclosure.

Figure 1:
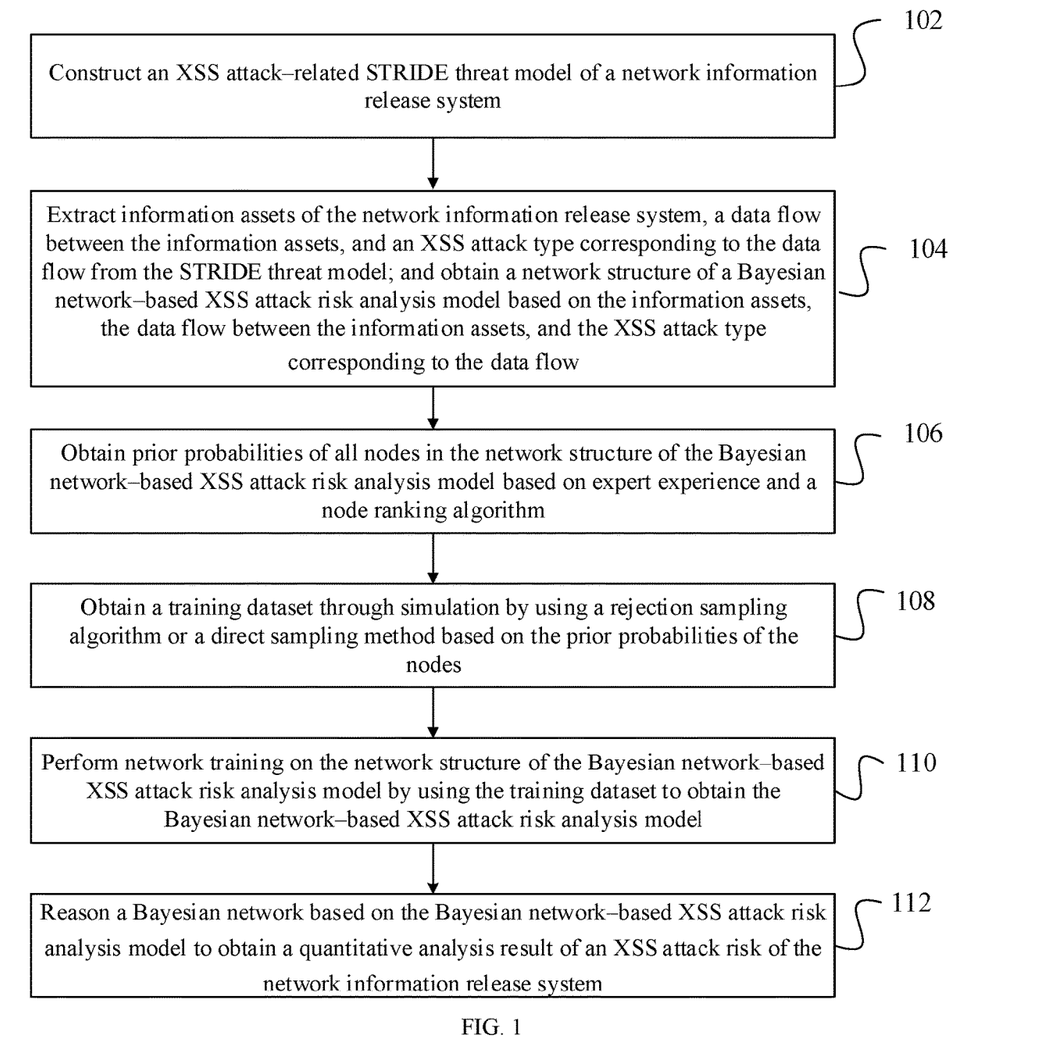
FIG. 1 is a schematic flowchart of an XSS risk analysis method based on a Bayesian network and a STRIDE model according to an embodiment.

In an embodiment, as shown in FIG. 1, an XSS risk analysis method based on a Bayesian network and a STRIDE model is provided that includes the following steps:

Step 102: Construct an XSS attack-related STRIDE threat model of a network information release system.

STRIDE is composed of acronyms of six threat types, namely, spoofing, tampering, repudiation, information disclosure, denial of service, and elevation of privilege. The above threats are respectively referred to as class-S, class-T, class-R, class-I, class-D and class-E threats.

A data flow of the network information release system is divided into three parts: IF1, namely, information release and update; IF2, namely, information collection and verification; and IF3, namely, information storage and extraction. Statistical analysis is carried out by data flow to determine whether each data flow and its associated information asset in this model are vulnerable to an XSS attack and further suffer from the class-S, class-T, class-R, class-I, class-D and class-E threats. A specific process is as follows:

(1) A data flow of IF1 may face threat ①. After a user clicks a link injected with XSS vulnerability code by an attacker, a server receives related request data and sends processed code data containing an XSS vulnerability to a browser. After the browser runs this malicious code, the attacker can view or tamper with data, resulting in information disclosure (class-I threat) or tampering (class-T threat).

(2) In a data flow of IF2, a reflective XSS attack may occur. In threat ②, an attacker who implements an XSS attack may use a social network site to launch a denial of service attack and point malicious code to a target victim website. If a large quantity of users forwards pages containing the malicious code, the victim website may become overwhelmed and may stop making a response, which contributes to the denial of service attack and results in denial of service (class-D threat). In threat ③, if an attacker inserts some malicious code for obtaining a user's sensitive information into the XSS vulnerability code, the user's sensitive information is disclosed, resulting in information disclosure (class-I threat). In threat ④, an attacker attacks a network server by tampering with a web page, resulting in tampering (class-T threat). An XSS worm is a typical example. In threat ⑤, a path from a web server to a database access component or an opposite path is vulnerable to a stored XSS attack, which generally occurs on a web application that stores a user's data in a database, resulting in information disclosure (class-I threat) and tampering (class-T threat). In threat ⑧, an attacker steals cookie information of a legitimate user through XSS session hijacking to complete login as the hijacked user to carry out a malicious operation, which is classified as spoofing (class-S threat), information disclosure (class-I threat), and elevation of privilege (class-E threat).

(3) In a data flow of IF3, threats ⑥ and ⑦ may exist. In threat ⑥, when carrying out an XSS attack, an attacker may also initiate a denial of service attack to send a large quantity of TCP/IP packets. As a result, a database server cannot respond to a legitimate request of a valid user, resulting in denial of service (class-D threat). In threat ⑦, if an XSS attack occurs on an intranet, an attacker first obtains an IP address of the intranet, gets an application fingerprint of the intranet, and finally takes advantage of a vulnerability in the intranet to further carry out a malicious operation to steal and tamper with data in the database, which is classified as information disclosure (class-I threat) and tampering (class-T threat).

Figure 3:
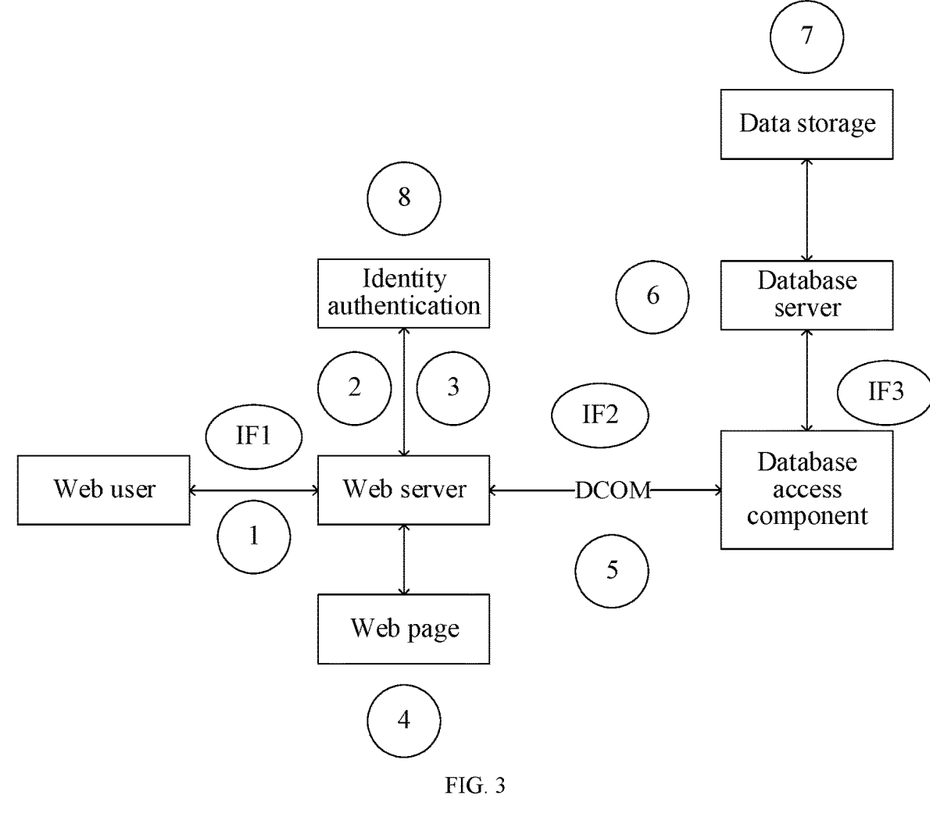
FIG. 3 is a schematic structural diagram of a STRIDE threat model according to an embodiment.

Thus, an example STRIDE threat model of the network information release system is established, as shown in FIG. 3.

Step 104 includes: Extract information assets of the network information release system, a data flow between the information assets, and an XSS attack type corresponding to the data flow from the STRIDE threat model; and obtain a network structure of a Bayesian network-based XSS attack risk analysis model based on the information assets, the data flow between the information assets, and the XSS attack type corresponding to the data flow.

As shown in FIG. 3, the information assets refer to components of the network information release system, such as a web user, a web server, a web page, an identity authentication component, a data storage component, a database server, and a database access component. The data flow between the information assets includes the data flow of IF1, namely, information release and update; the data flow of IF2, namely, information collection and verification; and the data flow of IF3, namely, information storage and extraction. The XSS attack type is a class-S, class-T, class-R, class-T, class-D, or class-E threat. Based on the STRIDE threat model of the data flow of the network information release system in FIG. 3, nodes in a Bayesian network model, variable content of the nodes in the Bayesian network model, and a relationship between the nodes in the Bayesian network model are extracted to construct the network structure of the Bayesian network-based XSS attack risk analysis model.

Step 106 includes: Obtain prior probabilities of all nodes in the network structure of the Bayesian network-based XSS attack risk analysis model based on expert experience and a node ranking algorithm.

Node ranking is based on a double-sided truncated normal distribution (TNormal distribution, hereinafter referred to as TN distribution), which represents a discrete variable. A central trend of the ranked nodes is a weighting function of a parent node. The TN distribution ranked nodes can use least expert experience to inspire construction of the prior probabilities of the nodes to construct a node probability table (NPT). A state of a ranked node is represented by an ordinal scale, and the ordinal scale can be mapped to a continuous and monotonically ordered bounded numerical scale. A mean part u that is of the TN distribution and obtained by using the ranking algorithm is a prior probability of a corresponding node.

Step 108 includes: Obtain a training dataset through simulation by using a rejection sampling algorithm or a direct sampling method based on the prior probabilities of the nodes.

The rejection sampling algorithm is based on the following steps:
(1) First, a sample is extracted from a complex target distribution, and this distribution is denoted as p(x). In addition, there is another simple suggested distribution q(x) for sampling. Then, it is assumed herein that a constant k satisfies all values of x, and x represents the sample extracted from the complex target distribution. $kq(x) \geq p(x)$
(2) A sample $Z_0$ is extracted from a suggested distribution q(z).
(3) A second sample $u_0$ is extracted from a uniform distribution on $[0, kq(Z_0)]$.
(4) If $u_0 > p(Z_0)$, the sample $u_0$ is rejected; otherwise, the sample $u_0$ is accepted.

Some samples are obtained by using the direct sampling method to perform simulation in order to obtain datasets of nodes corresponding to these samples, and other samples are obtained by using the rejection sampling algorithm to perform simulation in order to obtain datasets of nodes corresponding to these samples.

Step 110: Perform network training on the network structure of the Bayesian network-based XSS attack risk analysis model by using the training dataset to obtain the Bayesian network-based XSS attack risk analysis model.

The network structure that is of the Bayesian network-based XSS attack risk analysis model and constructed by using the STRIDE threat model is an initial structure without a reasoning capability. Network training needs to be performed on the network structure by using the training dataset. Because the training dataset contains prior information, a network structure obtained after continuous network training has a certain reasoning capability and can be used to reason a Bayesian network to obtain the Bayesian network-based XSS attack risk analysis model.

Step 112: Reason the Bayesian network based on the Bayesian network-based XSS attack risk analysis model to obtain a quantitative analysis result of an XSS attack risk of the network information release system.

The quantitative analysis result of the XSS attack risk of the network information release system can be divided into a probability of an XSS attack event on the network information release system and a weak key node of the network information release system.

The XSS risk analysis method and apparatus based on a Bayesian network and a STRIDE model first construct an XSS attack-related STRIDE threat model of a network information release system; extract information assets of the network information release system, a data flow between the information assets, and an XSS attack type corresponding to the data flow from the STRIDE threat model; take the information assets as nodes in a Bayesian network model, and take, as variable content of the nodes in the Bayesian network model, the XSS attack type corresponding to the data flow; set a relationship between the nodes in the Bayesian network model based on hierarchical relationships of the information assets and a direction of the data flow between the information assets, and obtain a network structure of a Bayesian network-based XSS attack risk analysis model; obtain prior probabilities of all nodes in the network structure of the Bayesian network-based XSS attack risk analysis model based on expert experience and a node ranking algorithm; obtain a training dataset through simulation by using a rejection sampling algorithm or a direct sampling method based on the prior probabilities of the nodes; perform network training on the network structure of the Bayesian network-based XSS attack risk analysis model by using the training dataset to obtain the Bayesian network-based XSS attack risk analysis model; analyze the STRIDE threat model to convert the STRIDE threat model into the Bayesian network-based XSS attack risk analysis model, such that the Bayesian network-based XSS attack risk analysis model contains all information in the STRIDE threat model and has a reasoning capability; and reason a Bayesian network based on the Bayesian network-based XSS attack risk analysis model to obtain probabilities that the nodes in the Bayesian network model are in a safe state, so as to realize quantitative analysis of an XSS attack risk of a web system, where a smaller probability leads to a higher XSS attack risk of a corresponding node.

In an embodiment, the step of obtaining a network structure of a Bayesian network-based XSS attack risk analysis model based on the information assets, the data flow between the information assets, and the XSS attack type corresponding to the data flow includes: taking the information assets as the nodes in the Bayesian network model, and taking, as the variable content of the nodes in the Bayesian network model, the XSS attack type corresponding to the data flow; setting a relationship between the nodes in the Bayesian network model based on hierarchical relationships of the information assets and a direction of the data flow between the information assets; and obtaining the network structure of the Bayesian network-based XSS attack risk analysis model based on the nodes in the Bayesian network model, the variable content of the nodes in the Bayesian network model, and the relationship between the nodes in the Bayesian network model.

As shown in FIG. 3, the information assets, namely, the components of the system, shown in the figure are the nodes in the Bayesian network model, and a threat type faced by an information data flow corresponding to each node is expressed as variable content of the node. For example, a threat to a data flow corresponding to the web user is threat ①, and threat types include information disclosure (class-I threat) and tampering (class-T threat). Therefore, variable content of the web user includes information disclosure (represented by I), tampering (represented by T), and a normal state (indicating that the web user is not threatened by an attack, which is represented by N). In addition to the various components of the system, an overall assessment node is also needed to assess an overall risk state of the system. Therefore, IF1, IF2, IF3, and system overall assessment (Total) are used as the overall assessment node of the system. Herein, five levels including very low, low, medium, high, and very high are defined to represent variable content of the overall assessment node and are represented by letters VL, L, M, H, and VH, respectively. After statistical analysis, all nodes included in the constructed Bayesian network model and their variable content are shown in Table 1.

TABLE 1

Node state statistics of the Bayesian network model

| Node | Component corresponding to the node | State content |
|---|---|---|
| U | Web user | I, T, and N |
| I | Identity authentication | S, I, E, and N |
| P | Web page | T and N |
| S | Data storage | I, T, and N |
| W | Web server | D, I, and N |
| D | Database server | D and N |
| A | Access component | I, T, and N |
| IF1 | Information release and update | VL, L, M, H, and VH |
| IF2 | Information collection and analysis | VL, L, M, H, and VH |
| IF3 | Information storage and extraction | VL, L, M, H, and VH |
| Total | Overall assessment | VL, L, M, H, and VH |

Figure 4:
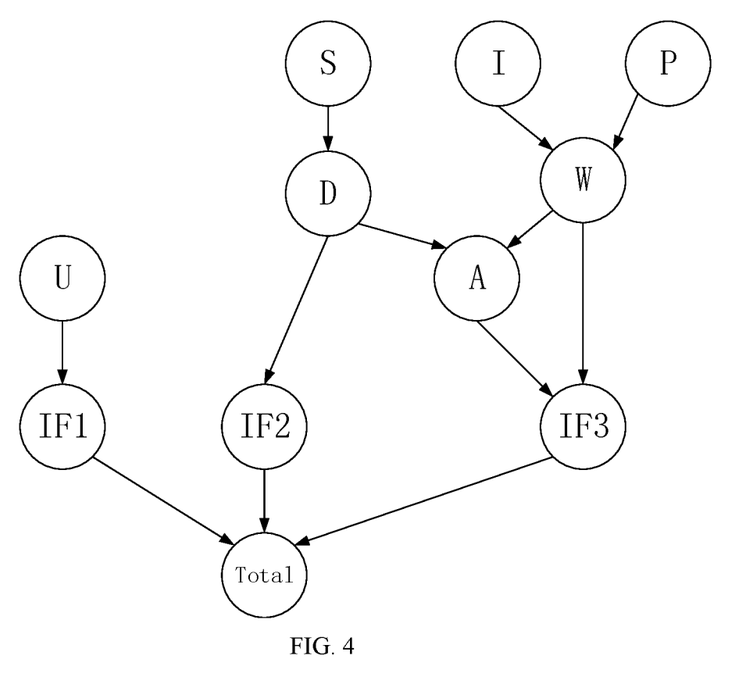
FIG. 4 is a schematic diagram of a network structure of a Bayesian network risk analysis model according to an embodiment.

After all the nodes in the model are constructed, the relationship between the nodes in the model is initialized based on the hierarchical relationships of the components of the system and the direction of the data flow between the components, in other words, a directed arc part in a structural diagram of the Bayesian network is drawn. In FIG. 3, attacks made by an attacker on the identity authentication component and the web page, namely, threat ④ and threat ⑧, are attacks on the web server. Therefore, the identity authentication component and the web page can be used as parent nodes of the web server; in other words, I and P are the parent nodes of W. The attacker's attack on the data storage component is an attack on the database server. Therefore, the data storage component is used as a parent node of the database, in other words, S is the parent node of D. If there is mutual access between the web server and the database server, which is indicated by a location of threat ⑤, the web server and the database server have a common child node, namely, the access component. In this case, W and D are parent nodes of A. As shown in FIG. 3, all threats are classified into three data flows. The web user corresponds to the data flow of IF1; in other words, U is a parent node of IF1. The identity authentication component, the web page, the web server, and the database access component correspond to the data flow of IF2; in other words, W and A are parent nodes of IF2. The data storage component and the database server correspond to the data flow of IF3; in other words, D is a parent node of IF3. The network structure of the Bayesian network-based XSS attack risk analysis model is shown in FIG. 4.

In an embodiment, the nodes include a parent node and a child node. The step of obtaining prior probabilities of all nodes in the network structure of the Bayesian network-based XSS attack risk analysis model based on expert experience and a node ranking algorithm includes: obtaining a proportion of a vulnerability type in a Bayesian network model based on the expert experience, and taking the proportion of the vulnerability type as a prior probability of the parent node in the Bayesian network model; and performing ranking calculation on the child node in the Bayesian network model by using the node ranking algorithm to obtain a prior probability of the child node in the Bayesian network model.

In a specific example, because the attacker often uses a network vulnerability to attack a target, a distribution of network vulnerability types shown in Table 2 is used as expert experience knowledge and represents attacked states of the nodes in the model in this specification. Proportions of vulnerability types related to the attack types in the model in this specification in Table 2 are selected as prior probabilities of different states when the nodes in the model are attacked. A node that is not attacked is in a normal state. In this way, prior probabilities of the nodes U to A in the Bayesian network model are obtained. Among the network vulnerability types shown in Table 2, the attacker is likely to use a weak password vulnerability to steal an account, a password, and other information, resulting in spoofing, elevation of privilege, and tampering. A logic vulnerability is a common vulnerability, which is sometimes easily encountered in a vulnerability mining process. The logic vulnerability usually includes: arbitrary password modification, a payment vulnerability, password retrieval, privilege exceeding, and the like. Once the attacker uses these vulnerabilities, information disclosure and elevation of privilege may easily be caused. The attacker can enhance privileges by using a privilege vulnerability. However, sufficiently enhanced privileges can destroy the whole system, resulting in elevation of privilege easily. An application sometimes needs to call some functions for executing system commands. When the attacker uses a command execution vulnerability to control parameters in these functions, an execution error occurs, causing denial of service to the network. A statistical result of vulnerability screening is shown in Table 3.

Corresponding information of the nodes in the model in Table 2 and Table 3 are extracted to obtain the prior probability of each node, as shown in Table 4.

TABLE 2

Distribution of network vulnerability types

| Vulnerability type | Server | Web page | Database | Web user | Access |
|---|---|---|---|---|---|
| Information disclosure | 14.6% | 11.5% | 14.1% | 14.4% | 11.4% |
| Weak password | 10.3% | 15.2% | 12.6% | 11.5% | 9.9% |
| Command execution | 10.9% | 8.1% | 12.1% | 7.6% | 9.5% |
| Logic | 9.0% | 2.2% | 2.0% | 4.6% | 1.3% |
| Privilege exceeding | 6.2% | 3.6% | 3.2% | 4.1% | 2.3% |
| XSS | 3.9% | 0.8% | 0.7% | 1.2% | 0.8% |

TABLE 3

Statistical result of network vulnerability and threat types

| Vulnerability type | STRIDE threat type |
| --- | --- |
| Weak password | Spoofing (S), elevation of privilege (E), and tampering (T) |
| Logic | Information disclosure (I) and elevation of privilege (E) |
| Privilege | Elevation of privilege (E) |
| Command execution | Denial of service (D) |
| Information disclosure | Information disclosure (I) |

The nodes IF1, IF2, IF3, and Total represent three data flows of the system and an overall assessment result of the system. On one hand, states of the nodes IF1, IF2, IF3, and Total are directly determined by states of their related parent nodes. On the other hand, because these four nodes do not correspond to actual components in the model, relevant expert experience is deficient. Therefore, prior probabilities of these four nodes are created by using the node ranking algorithm.

In a specific embodiment, a scale of [0-1] is divided into five-point calibrations {very low, low, middle, high, and very high} at each spacing of 0.2 width to correspond to the states of the nodes IF1, IF2, IF3, and Total; in other words, to depict five risk levels of the node from low to high. It is worth noting that the spacing width is not necessarily limited to 0.2 and may also be another value, which is specified based on actual needs.

In order to assess the severity of a threat to the network information release system, a risk value can be quantified and calculated by using a DREAD model. The DREAD model is a classification scheme for quantifying and comparing each to-be-evaluated threat and classifying a severity level of the to-be-evaluated threat. Based on the expert experience, weights of various states of the node in the model under different threats are given and expressed by integers 1, 2, 3, 4, and 5, respectively. Herein, $X_i$ is used to represent a state of the parent node. Since risks faced by the node in different states are ranked as follows: normal state <information disclosure state<tampering state<denial of service state<threat combination state, a weight of the normal state is 1, a weight of the information disclosure state is 2, and so on. A state value is obtained by dividing a corresponding integer value by a mean state value, namely:

$$X_i = \frac{i}{\sum_{i=1}^{n} X_i / n}$$

A weight contributed by each $X_i$ to the child node, namely, $W_i$, depends on a proportion of a conditional probability representing the state of the parent node.

A value of an adjustment coefficient k is set to 2 to ensure that datasets obtained by sampling double-sided TN distributions of the nodes IF1, IF2, IF3, and Total are more in line with an actual attack environment in subsequent data pre-processing. When k=1 or k=3, a result obtained by sampling a corresponding TN distribution is extreme. When k is 2, a sampling result is more reasonable and in line with an actual attack environment of the network information release system.

Taking the node IF1 node as an example, a parent node of the node IF1 is U (web user), and a prior probability of the parent node U is 69.5% in the normal state N, 19% in the information disclosure state I, and 11.5% in the tampering state T. The normal state N, the information disclosure state I, and the tampering state T of the parent node U are represented by X1, X2, and X3, respectively.

TN distribution describes the node IF1, n=3, with an appropriate error variance $\sigma^2 Y=0.2$. In this case, a generated joint distribution is:

$$P(Y \mid X) = TN\left[\frac{6.95X_1 + 1.9X_2 + 1.15X_3}{6.95 + 1.9 + 1.15}, 0.2, 0, 1\right]$$

The node IF2 has two parent nodes W and A. Conditional probabilities of these two parent nodes need to be accumulatively counted, and then calculated based on ranked nodes. The node Total represents the overall assessment result of the model. Therefore, after prior probabilities (expressed by a mean value of the TN distribution) of the parent nodes IF1, IF2, and IF3 are obtained, a mean value of risks suffered by the three parent nodes is taken to represent a risk level of the node Total. In other words, in the TN distribution, mean values of $X_1$, $X_2$, and $X_3$ each are 1. The prior probabilities of the nodes IF1, IF2, IF3, and Total are obtained, as shown in Table 4.

TABLE 4

Statistical result of the prior probabilities of the nodes

|   | S | T | R | I | D | E | N |
| --- | --- | --- | --- | --- | --- | --- | --- |
| U | 0 | 0.115 | 0 | 0.19 | 0 | 0 | 0.695 |
| I | 0.115 | 0 | 0 | 0.19 | 0 | 0.087 | 0.608 |
| P | 0 | 0.152 | 0 | 0 | 0 | 0 | 0.848 |
| S | 0 | 0.126 | 0 | 0.161 | 0 | 0 | 0.713 |
| D | 0 | 0 | 0 | 0 | 0.109 | 0 | 0.891 |
| A | 0 | 0.099 | 0 | 0.127 | 0 | 0 | 0.774 |
| W | 0 | 0 | 0 | 0.236 | 0.109 | 0 | 0.655 |

In an embodiment, the training dataset includes a mixed Gaussian distribution dataset and a simple distribution dataset. The step of obtaining a training dataset through simulation by using a rejection sampling algorithm or a direct sampling method based on the prior probabilities of the nodes includes: confirming, based on the prior probability of the parent node in the Bayesian network model, that the parent node in the Bayesian network model complies with a mixed Gaussian distribution, and obtaining the mixed Gaussian distribution dataset by using the rejection sampling algorithm; and confirming, based on the prior probability of the child node in the Bayesian network model, that the child node in the Bayesian network model complies with a simple distribution, and obtaining the simple distribution dataset by using the direct sampling method.

In the present disclosure, the four nodes IF1, IF2, IF3, and Total in the model comply with the simple distribution. Therefore, dataset sampling is performed by using the direct sampling method to obtain the simple distribution dataset. For the nodes U, S, D, I, P, W, and A in the model, their variables representing state content comply with two or more conditional probability distributions, and a corresponding mixed continuous Gaussian distribution that is established has two or more mean values. Therefore, the rejection sampling algorithm is used to create the mixed Gaussian distribution dataset.

In an embodiment, the performing network training on the network structure of the Bayesian network-based XSS attack risk analysis model by using the training dataset to obtain the Bayesian network-based XSS attack risk analysis model includes: obtaining a bnlearn package; and performing network training on the network structure of the Bayesian network-based XSS attack risk analysis model by using the training dataset and a model2network function in the bnlearn package to obtain the Bayesian network-based XSS attack risk analysis model.

In the present disclosure, a Bayesian network object (hereinafter referred to as a BN object) is built by using the bnlearn package in R language. The bnlearn package is a powerful tool for applying the Bayesian network.

The previously established Bayesian network model is manually built by using the model2network function in the bnlearn package, and a BN object is obtained by using a bn.fit function in the bnlearn package. So far, the complete Bayesian network-based XSS attack risk analysis model has been successfully created. The BN object contains detailed parameters of all the nodes in the model, namely, a complete conditional probability table describing state content of the nodes and provides a basis for Bayesian network reasoning such as event probability query.

In an embodiment, the step of reasoning a Bayesian network based on the Bayesian network-based XSS attack risk analysis model to obtain a quantitative analysis result of an XSS attack risk of the network information release system includes: obtaining a key node and a non-key node in the Bayesian network; setting evidence conditions of an attacked state of the key node and a normal state or medium risk state of the non-key node; obtaining, through CP traversal-based query, probabilities that the key node and the non-key node are in a safe state; and obtaining the quantitative analysis result of the XSS attack risk of the network information release system based on the probabilities that the key node and the non-key node are in the safe state.

In another embodiment, the step of obtaining, through CP traversal-based query, probabilities that the key node and the non-key node are in a safe state includes: obtaining, through CP traversal-based query by using a cpquery function in the bnlearn package, the probabilities that the key node and the non-key node are in the safe state under the evidence conditions.

Based on risks of the XSS attack risk analysis model encountering various attacks and threats, probabilities of the overall assessment node (i.e., Total) of the system model under various evidence conditions are found through variable control, in other words, by giving evidence conditions that the key node under discussion is in the attacked state and the non-key node is in the normal state or medium risk state, and then by performing CP traversal-based query (a detailed process is realized by using the cpquery function in the bnlearn package). A smaller probability obtained through traversal-based query indicates a weaker key node in the system model.

In an experiment, the nodes U, I, P, S, W, D, and A are taken as objects of interest to perform traversal-based query for 1000 times, and then a corresponding node with the lowest probability in each query is counted. A statistical result is shown in Table 5.

TABLE 5

| Quantity of times of performing traversal-based query on the key nodes | | | | | | | |
|---|---|---|---|---|---|---|---|
| Node type | | | | | | | |
| | U | I | P | S | W | D | A |
| Quantity of times | 109 | 80 | 253 | 111 | 94 | 225 | 128 |

It can be seen from the result in Table 5 that a quantity of taking the node P as a key node is the highest, accounting for about 25.3% of a total quantity, and a quantity of taking the node D as a key node also is high, accounting for about 22.5% of the total quantity. The proportions of these two nodes are much higher than those of other nodes. There is no doubt that the node P (web page) and the node D (database server) node are weak nodes in the model of the network information release system that must be searched. Measures must be taken to strengthen related protection for these two nodes.

It should be understood that although the steps in the flowchart of FIG. 1 are sequentially displayed according to the arrows, these steps are not necessarily performed in the order indicated by the arrows. The execution order of these steps is not strictly limited, and these steps may be executed in other orders unless clearly described otherwise. Moreover, at least some of the steps in FIG. 1 may include a plurality of sub-steps or stages. The sub-steps or stages are not necessarily executed at the same time but may be executed at different times. The execution order of the sub-steps or stages is not necessarily carried out sequentially but may be executed alternately with other steps or at least some of the sub-steps or stages of other steps.

Figure 2:
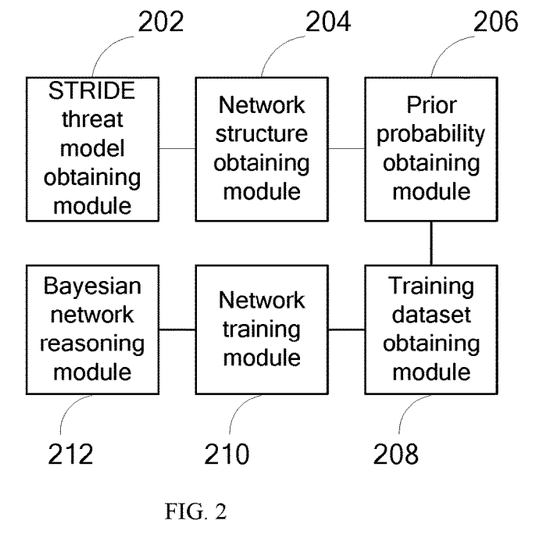
FIG. 2 is a structural block diagram of an XSS risk analysis apparatus based on a Bayesian network and a STRIDE model according to an embodiment.

In an embodiment, as shown in FIG. 2, an XSS risk analysis apparatus based on a Bayesian network and a STRIDE model includes: a STRIDE threat model obtaining module 202, a network structure obtaining module 204, a prior probability obtaining module 206, a training dataset obtaining module 208, a network training module 210, and a Bayesian network reasoning module 212.

The STRIDE threat model obtaining module 202 is configured to construct an XSS attack-related STRIDE threat model of a network information release system.

The network structure obtaining module 204 is configured to: extract information assets of the network information release system, a data flow between the information assets, and an XSS attack type corresponding to the data flow from STRIDE threat model; and obtain a network structure of a Bayesian network-based XSS attack risk analysis model based on the information assets, the data flow between the information assets, and the XSS attack type corresponding to the data flow.

The prior probability obtaining module 206 is configured to obtain prior probabilities of all nodes in the network structure of the Bayesian network-based XSS attack risk analysis model based on expert experience and a node ranking algorithm.

The training dataset obtaining module 208 is configured to obtain a training dataset through simulation by using a rejection sampling algorithm or a direct sampling method based on the prior probabilities of the nodes.

The network training module 210 is configured to perform network training on the network structure of the Bayesian network-based XSS attack risk analysis model by using the training dataset to obtain the Bayesian network-based XSS attack risk analysis model.

The Bayesian network reasoning module 212 is configured to reason a Bayesian network based on the Bayesian network-based XSS attack risk analysis model to obtain a quantitative analysis result of an XSS attack risk of the network information release system.

In an embodiment, when obtaining the network structure of the Bayesian network-based XSS attack risk analysis model based on the information assets, the data flow between the information assets, and the XSS attack type corresponding to the data flow, the network structure obtaining module 204 is further configured to: take the information assets as nodes in a Bayesian network model, and taking, as variable content of the nodes in the Bayesian network model, the XSS attack type corresponding to the data flow; set a relationship between the nodes in the Bayesian network model based on hierarchical relationships of the information assets and a direction of the data flow between the information assets; and obtain the network structure of the Bayesian network-based XSS attack risk analysis model based on the nodes in the Bayesian network model, the variable content of the nodes in the Bayesian network model, and the relationship between the nodes in the Bayesian network model.

In an embodiment, when obtaining the prior probability of each node in the network structure of the Bayesian network-based XSS attack risk analysis model based on the expert experience and the node ranking algorithm, the prior probability obtaining module 206 is further configured to: obtain a proportion of a vulnerability type in a Bayesian network model based on the expert experience, and take the proportion of the vulnerability type as a prior probability of a parent node in the Bayesian network model; and perform ranking calculation on a child node in the Bayesian network model by using the node ranking algorithm to obtain a prior probability of the child node in the Bayesian network model. The nodes include the parent node and the child node.

In an embodiment, when obtaining the training dataset through simulation by using the rejection sampling algorithm or the direct sampling method based on the prior probabilities of the nodes, the training dataset obtaining module 208 is further configured to: confirm, based on the prior probability of the parent node in the Bayesian network model, that the parent node in the Bayesian network model complies with a mixed Gaussian distribution, and obtain a mixed Gaussian distribution dataset by using the rejection sampling algorithm; and confirm, based on the prior probability of the child node in the Bayesian network model, that the child node in the Bayesian network model complies with a simple distribution, and obtain a simple distribution dataset by using the direct sampling method. The training dataset includes the mixed Gaussian distribution dataset and the simple distribution dataset.

In an embodiment, when performing network training on the network structure of the Bayesian network-based XSS attack risk analysis model by using the training dataset to obtain the Bayesian network-based XSS attack risk analysis model, the network training module 210 is further configured: obtain a bnlearn package; and perform network training on the network structure of the Bayesian network-based XSS attack risk analysis model by using the training dataset and a model2network function in the bnlearn package to obtain the Bayesian network-based XSS attack risk analysis model.

In an embodiment, when reasoning the Bayesian network based on the Bayesian network-based XSS attack risk analysis model to obtain the quantitative analysis result of the XSS attack risk of the network information release system, the Bayesian network reasoning module 212 is further configured to: obtain a key node and a non-key node in the Bayesian network; set evidence conditions of an attacked state of the key node and a normal state or medium risk state of the non-key node; obtain, through CP traversal-based query, probabilities that the key node and the non-key node are in a safe state; and obtain the quantitative analysis result of the XSS attack risk of the network information release system based on the probabilities that the key node and the non-key node are in the safe state.

In another embodiment, when obtaining, through CP traversal-based query, the probabilities that the key node and the non-key node are in the safe state, the Bayesian network reasoning module 212 is further configured to: obtain, through CP traversal-based query by using a cpquery function in the bnlearn package, the probabilities that the key node and the non-key node are in the safe state under the evidence conditions.

For specific limitations of the XSS risk analysis apparatus based on a Bayesian network and a STRIDE model, reference may be made to the above limitations of the XSS risk analysis method based on a Bayesian network and a STRIDE model, and details are not described herein again. Various modules in the above XSS risk analysis apparatus based on a Bayesian network and a STRIDE model may be implemented fully or partially through software, hardware, and a combination thereof. The modules may be embedded in or independent of a processor of a computer device in a form of hardware or stored in a memory of the computer device in a form of software, such that the processor can easily invoke and execute corresponding operations of the modules.

In an embodiment, a computer device is provided. The computer device may be a terminal, and includes a processor, a memory, a network interface, a display, and an input apparatus that are connected through a system bus. The processor of the computer device is configured to provide calculation and control capabilities. The memory of the computer device includes a nonvolatile storage medium and an internal memory. The nonvolatile storage medium stores an operating system and a computer program. The internal memory provides an environment for operation of the operating system and the computer program in the nonvolatile storage medium. The network interface of the computer device is configured to communicate with an external terminal through a network. The computer program is executed by the processor to implement an XSS risk analysis method based on a Bayesian network and a STRIDE model. The display of the computer device may be an LCD or an e-ink display. The input apparatus of the computer device may be a touch layer covering the display, a key, a trackball or a touchpad set on a housing of the computer device, an external keyboard, touchpad or mouse, or the like.

Figure 5:
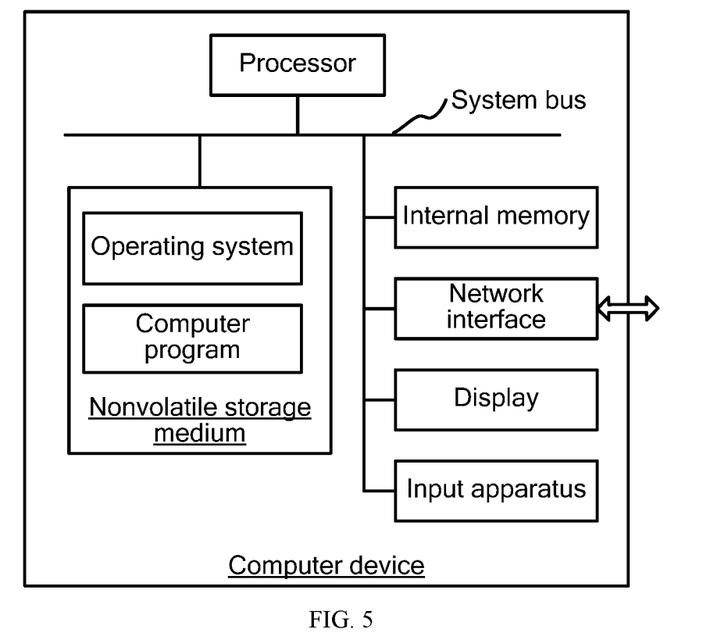
FIG. 5 is an internal structural diagram of a computer device according to an embodiment.

Those skilled in the art may understand that the structure shown in FIG. 5 is only a block diagram of a part of the structure related to the solutions of the present disclosure and does not constitute a limitation on a computer device to which the solutions of the present disclosure are applied. Specifically, the computer device may include more or less components than those shown in the figure, or combine some components, or have different component arrangements.

In an embodiment, a computer device is provided, including a memory and a processor, where the memory stores a computer program, and the computer program is executed by the processor to implement the steps of the methods in the above embodiments.

In an embodiment, a computer-readable storage medium is provided. The computer-readable storage medium stores a computer program, and the computer program is executed by a processor to implement the steps of the methods in the above embodiments.

Those of ordinary skill in the art may understand that all or some of the procedures of the methods in the above embodiments may be implemented by a computer program instructing related hardware. The computer program may be stored in a nonvolatile computer-readable storage medium.

When the computer program is executed, the procedures in the embodiments of the above methods may be performed. Any reference to a memory, a storage, a database, or other media used in the various embodiments of the present disclosure may include a nonvolatile and/or volatile memory. The nonvolatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As a description rather than a limitation, the RAM can be in different forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a Rambus direct RAM (RDRAM), a direct Rambus dynamic RAM (DRDRAM), and a Rambus dynamic RAM (RDRAM).

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

Only several implementations of the present disclosure are described in detail in the above embodiments, but they should not be construed as limiting the scope of the present disclosure. It should be noted that those of ordinary skill in the art can further make variations and improvements without departing from the concept of the present disclosure. These variations and improvements all fall within the protection scope of the present disclosure. Therefore, the protection scope of the present disclosure should be subject to the protection scope defined by the claims.

What is claimed is:

1. A cross-site scripting (XSS) risk analysis method based on a Bayesian network and a STRIDE model, comprising:
    constructing an XSS attack-related STRIDE threat model of a network information release system;
    extracting information assets of the network information release system, a data flow between the information assets, and an XSS attack type corresponding to the data flow from the STRIDE threat model; and obtaining a network structure of a Bayesian network-based XSS attack risk analysis model based on the information assets, the data flow between the information assets, and the XSS attack type corresponding to the data flow by
    taking the information assets as nodes in a Bayesian network model, and taking, as variable content of the nodes in the Bayesian network model, the XSS attack type corresponding to the data flow, and setting a relationship between the nodes in the Bayesian network model based on hierarchical relationships of the information assets and a direction of the data flow between the information assets, and
    obtaining the network structure of the Bayesian network-based XSS attack risk analysis model based on the nodes in the Bayesian network model, the variable content of the nodes in the Bayesian network model, and the relationship between the nodes in the Bayesian network model;
    obtaining prior probabilities of all nodes in the network structure of the Bayesian network-based XSS attack risk analysis model based on expert experience and a node ranking algorithm;
    obtaining a training dataset through simulation by using a rejection sampling algorithm or a direct sampling method based on the prior probabilities of the nodes;
    performing network training on the network structure of the Bayesian network-based XSS attack risk analysis model by using the training dataset to obtain the Bayesian network-based XSS attack risk analysis model; and
    determining the Bayesian network based on the Bayesian network-based XSS attack risk analysis model to obtain a quantitative analysis result of an XSS attack risk of the network information release system;
    identifying at least one weak node of the network information release system that is susceptible to an attack based on the quantitative analysis result obtained from the Bayesian network; and
    implementing protection measures in the network information release system to strengthen protection of the at least one weak node against the attack based on the identifying the at least one weak node.

2. The method according to claim 1, wherein the nodes in the network structure of the Bayesian network-based XSS attack risk analysis model comprise a parent node and a child node: and
    the step of obtaining the prior probabilities of all the nodes in the network structure of the Bayesian network-based XSS attack risk analysis model based on the expert experience and the node ranking algorithm comprises:
    obtaining a proportion of a vulnerability type in the Bayesian network model based on the expert experience, and taking the proportion of the vulnerability type as a prior probability of the parent node in the Bayesian network model; and
    performing ranking calculation on the child node in the Bayesian network model by using the node ranking algorithm to obtain a prior probability of the child node in the Bayesian network model.

3. The method according to claim 2, wherein the training dataset comprises a mixed Gaussian distribution dataset and a simple distribution dataset; and
    the step of obtaining the training dataset through simulation by using the rejection sampling algorithm or the direct sampling method based on the prior probabilities of the nodes comprises:
    confirming, based on the prior probability of the parent node in the Bayesian network model, that the parent node in the Bayesian network model complies with a mixed Gaussian distribution, and obtaining the mixed Gaussian distribution dataset by using the rejection sampling algorithm; and
    confirming, based on the prior probability of the child node in the Bayesian network model, that the child node in the Bayesian network model complies with a simple distribution, and obtaining the simple distribution dataset by using the direct sampling method.

4. The method according to claim 1, wherein the step of performing network training on the network structure of the Bayesian network-based XSS attack risk analysis model by using the training dataset to obtain the Bayesian network-based XSS attack risk analysis model comprises:
    obtaining a bnlearn package; and
    performing network training on the network structure of the Bayesian network-based XSS attack risk analysis model by using the training dataset and a model2network function in the bnlearn package to obtain the Bayesian network-based XSS attack risk analysis model.

5. The method according to claim 4, wherein the step of determining the Bayesian network based on the Bayesian network-based XSS attack risk analysis model to obtain the quantitative analysis result of the XSS attack risk of the network information release system comprises:
    obtaining a key node and a non-key node in the Bayesian network;
    setting evidence conditions of an attacked state of the key node and a normal state or medium risk state of the non-key node;
    obtaining, through conditional probability (CP) traversal-based query, probabilities that the key node and the non-key node are in a safe state; and
    obtaining the quantitative analysis result of the XSS attack risk of the network information release system based on the probabilities that the key node and the non-key node are in the safe state.

6. The method according to claim 5, wherein the step of obtaining, through CP traversal-based query, the probabilities that the key node and the non-key node are in the safe state comprises:
    obtaining, through CP traversal-based query by using a cpquery function in the bnlearn package, the probabilities that the key node and the non-key node are in the safe state under the evidence conditions.

7. A cross-site scripting (XSS) risk analysis apparatus based on a Bayesian network and a STRIDE model, comprising:
    a non-transitory computer-readable storage medium comprising at least one program of instructions; and
    at least one hardware processor configured to execute the program of instructions to implement a STRIDE threat model obtaining module, a network structure obtaining module, a prior probability obtaining module, a training dataset obtaining module, a network training module and a Bayesian network reasoning module, wherein
    the at least one hardware processor, in implementing the STRIDE threat model obtaining module, is configured to: construct an XSS attack-related STRIDE threat model of a network information release system,
    the at least one hardware processor, in implementing the network structure obtaining module, is configured to: extract information assets of the network information release system, a data flow between the information assets, and an XSS attack type corresponding to the data flow from the STRIDE threat model; and obtain a network structure of a Bayesian network-based XSS attack risk analysis model based on the information assets, the data flow between the information assets, and the XSS attack type corresponding to the data flow by
    taking the information assets as nodes in a Bayesian network model, and taking, as variable content of the nodes in the Bayesian network model, the XSS attack type corresponding to the data flow, and setting a relationship between the nodes in the Bayesian network model based on hierarchical relationships of the information assets and a direction of the data flow between the information assets, and
    obtaining the network structure of the Bayesian network-based XSS attack risk analysis model based on the nodes in the Bayesian network model, the variable content of the nodes in the Bayesian network model, and the relationship between the nodes in the Bayesian network model,
    the at least one hardware processor, in implementing the prior probability obtaining module, is configured to obtain prior probabilities of all nodes in the network structure of the Bayesian network-based XSS attack risk analysis model based on expert experience and a node ranking algorithm,
    the at least one hardware processor, in implementing the training dataset obtaining module, is configured to obtain a training dataset through simulation by using a rejection sampling algorithm or a direct sampling method based on the prior probabilities of the nodes,
    the at least one hardware processor, in implementing the network training module, is configured to perform network training on the network structure of the Bayesian network-based XSS attack risk analysis model by using the training dataset to obtain the Bayesian network-based XSS attack risk analysis model,
    the at least one hardware processor, in implementing the Bayesian network reasoning module, is configured to determine the Bayesian network based on the Bayesian network-based XSS attack risk analysis model to obtain a quantitative analysis result of an XSS attack risk of the network information release system, and
    the at least one hardware processor is configured to identify at least one weak node of the network information release system that is susceptible to an attack based on the quantitative analysis result obtained from the Bayesian network. And to implement protection measures in the network information release system to strengthen protection of the at least one weak node against the attack based on the identification of the at least one weak node.

8. A computer device, comprising a memory and a processor, wherein the memory stores a computer program, and the computer program is executed by the processor to implement the steps of the method according to claim 1.

9. A non-transitory computer-readable storage medium, wherein the non-transitory computer-readable storage medium stores a computer program, and the computer program, when executed by a processor, is configured to cause the processor to implement the steps of the method according to claim 1.

10. The computer device according to claim 9, wherein the nodes in the network structure of the Bayesian network-based XSS attack risk analysis model comprise a parent node and a child node; and
    the step of obtaining the prior probabilities of all the nodes in the network structure of the Bayesian network-based XSS attack risk analysis model based on the expert experience and the node ranking algorithm comprises:
    obtaining a proportion of a vulnerability type in a-the Bayesian network model based on the expert experience, and taking the proportion of the vulnerability type as a prior probability of the parent node in the Bayesian network model; and
    performing ranking calculation on the child node in the Bayesian network model by using the node ranking algorithm to obtain a prior probability of the child node in the Bayesian network model.

11. The computer device according to claim 10, wherein the training dataset comprises a mixed Gaussian distribution dataset and a simple distribution dataset; and the step of obtaining the training dataset through simulation by using the rejection sampling algorithm or the direct sampling method based on the prior probabilities of the nodes comprises:

confirming, based on the prior probability of the parent node in the Bayesian network model, that the parent node in the Bayesian network model complies with a mixed Gaussian distribution, and obtaining the mixed Gaussian distribution dataset by using the rejection sampling algorithm; and confirming, based on the prior probability of the child node in the Bayesian network model, that the child node in the Bayesian network model complies with a simple distribution, and obtaining the simple distribution dataset by using the direct sampling method.

12. The computer device according to claim 8, wherein the step of performing network training on the network structure of the Bayesian network-based XSS attack risk analysis model by using the training dataset to obtain the Bayesian network-based XSS attack risk analysis model comprises:

obtaining a bnlearn package; and performing network training on the network structure of the Bayesian network-based XSS attack risk analysis model by using the training dataset and a model2network function in the bnlearn package to obtain the Bayesian network-based XSS attack risk analysis model.

13. The computer device according to claim 12, wherein the step of determining the Bayesian network based on the Bayesian network-based XSS attack risk analysis model to obtain the quantitative analysis result of the XSS attack risk of the network information release system comprises:

obtaining a key node and a non-key node in the Bayesian network;

setting evidence conditions of an attacked state of the key node and a normal state or medium risk state of the non-key node;

obtaining, through conditional probability (CP) traversal-based query, probabilities that the key node and the non-key node are in a safe state; and obtaining the quantitative analysis result of the XSS attack risk of the network information release system based on the probabilities that the key node and the non-key node are in the safe state.

14. The computer device according to claim 13, wherein the step of obtaining, through C1 traversal-based query, the probabilities that the key node and the non-key node are in the safe state comprises: obtaining, through CP traversal-based query by using a cp query function in the bnlearn package, the probabilities that the key node and the non-key node are in the safe state under the evidence conditions.

15. The non-transitory computer-readable storage medium according to claim 9, wherein the nodes in the network structure-of-the Bayesian network-based XSS attack risk analysis model comprise a parent node and a child node; and the step of obtaining the prior probabilities of all the nodes in the network structure of the Bayesian network-based XSS attack risk analysis model based on the expert experience and the node ranking algorithm comprises:

obtaining a proportion of a vulnerability type in a-the Bayesian network model based on the expert experience, and taking the proportion of the vulnerability type as a prior probability of the parent node in the Bayesian network model; and performing ranking calculation on the child node in the Bayesian network model by using the node ranking algorithm to obtain a prior probability of the child node in the Bayesian network model.

16. The non-transitory computer-readable storage medium according to claim 15, wherein the training dataset comprises a mixed Gaussian distribution dataset and a simple distribution dataset; and 9 the step of obtaining the training dataset through simulation by using the rejection sampling algorithm or the direct sampling method based on the prior probabilities of the nodes comprises:

confirming, based on the prior probability of the parent node in the Bayesian network model, that the parent node in the Bayesian network model complies with a mixed Gaussian distribution, and obtaining the mixed Gaussian distribution dataset by using the rejection sampling algorithm; and confirming, based on the prior probability of the child node in the Bayesian network model, that the child node in the Bayesian network model complies with a simple distribution, and obtaining the simple distribution dataset by using the direct sampling method.

17. The non-transitory computer-readable storage medium according to claim 9, wherein the step of performing network training on the network structure of the Bayesian network-based XSS attack risk analysis model by using the training dataset to obtain the Bayesian network-based XSS attack risk analysis model comprises:

obtaining a bnlearn package; and performing network training on the network structure of the Bayesian network-based XSS attack risk analysis model by using the training dataset and a model2network function in the bnlearn package to obtain the Bayesian network-based XSS attack risk analysis model.

* * * * *